(12) United States Patent
Jarr et al.

(10) Patent No.: US 12,492,033 B2
(45) Date of Patent: Dec. 9, 2025

(54) DEVICE AND METHOD FOR AUTOMATICALLY REMOVING A FILM WRAPPING FROM PALLETIZED STACKS OF PRODUCTS

(71) Applicant: Dematic GmbH, Heusenstamm (DE)

(72) Inventors: Daniel Jarr, Offenbach (DE); Max-Reinhard Lewandoske, Aschaffenburg (DE)

(73) Assignee: Dematic GmbH, Heusenstamm (DE)

( * ) Notice: Subject to any disclaimer, the term of this patent is extended or adjusted under 35 U.S.C. 154(b) by 313 days.

(21) Appl. No.: 17/697,595

(22) Filed: Mar. 17, 2022

(65) Prior Publication Data

US 2022/0306332 A1 Sep. 29, 2022

(30) Foreign Application Priority Data

Mar. 24, 2021 (DE) .......................... 102021107386.3

(51) Int. Cl.
 B65B 69/00 (2006.01)
(52) U.S. Cl.
 CPC ...... *B65B 69/0033* (2013.01); *B65B 2210/20* (2013.01)
(58) Field of Classification Search
 CPC ...... B26D 7/0006; B26D 7/1863; B26D 5/10; B65B 69/0033; B65B 2210/20
 USPC .......................................................... 83/78
 See application file for complete search history.

(56) References Cited

U.S. PATENT DOCUMENTS

| | | | | |
|---|---|---|---|---|
| 4,488,466 A | * | 12/1984 | Jones ..................... | B65H 35/06 225/105 |
| 5,386,751 A | * | 2/1995 | Dylla ................... | B65H 19/105 225/93 |
| 2004/0099110 A1 | * | 5/2004 | Cere ................... | B65B 69/0033 83/559 |
| 2013/0247733 A1 | * | 9/2013 | Uetake ................. | G11B 5/4833 83/374 |
| 2017/0015456 A1 | | 1/2017 | Stapfer | |

(Continued)

FOREIGN PATENT DOCUMENTS

| | | | | |
|---|---|---|---|---|
| CN | 109204984 A | * | 1/2019 | .......... B32B 43/006 |
| DE | 4212095 C1 | | 8/1993 | |

(Continued)

OTHER PUBLICATIONS

Translation of CN 109204984 A (Year: 2024).*

*Primary Examiner* — Nhat Chieu Q Do

(74) *Attorney, Agent, or Firm* — Gardner, Linn, Burkhart & Ondersma LLP

(57) ABSTRACT

A cutting head for cutting a film wrapping from palletized stacks of products, having a cutting element for cutting through the film, where the cutting element is disposed between at least two opposing contact elements and is set back with respect to the film contact plane formed by the opposing contact elements in order to form a cutting recess, and having a vacuum unit to suck the region of the film wrapping to be cut locally into the cutting recess for interaction with the cutting element. A device having the cutting head further includes a pallet place for the arrangement of the pallet correspondingly wrapped with film, where the cutting head is disposed on a support arm that is configured to travel such that the cutting head remains in contact with the film via the two opposing contact elements during cutting.

15 Claims, 5 Drawing Sheets

(56) References Cited

U.S. PATENT DOCUMENTS

| | | | |
|---|---|---|---|
| 2021/0139175 A1* | 5/2021 | Suolahti | B65B 11/025 |
| 2022/0119139 A1* | 4/2022 | Vaccari | B65B 11/58 |
| 2023/0159208 A1 | 5/2023 | Bjerring et al. | |

FOREIGN PATENT DOCUMENTS

| | | |
|---|---|---|
| DE | 4311421 A1 | 10/1994 |
| DE | 19724040 A1 | 8/1998 |
| DE | 69503000 T2 | 5/1999 |
| DE | 102014003652 A1 | 9/2015 |
| DE | 102018216534 A1 | 4/2020 |
| EP | 0720564 A1 | 7/1996 |
| EP | 0692430 B1 | 6/1998 |
| EP | 1935524 A1 | 6/2008 |
| GB | 2265888 A | 10/1993 |
| JP | S57140990 U * | 9/1982 |
| JP | H02166034 A * | 6/1990 |
| WO | 2006112712 A2 | 10/2006 |

\* cited by examiner

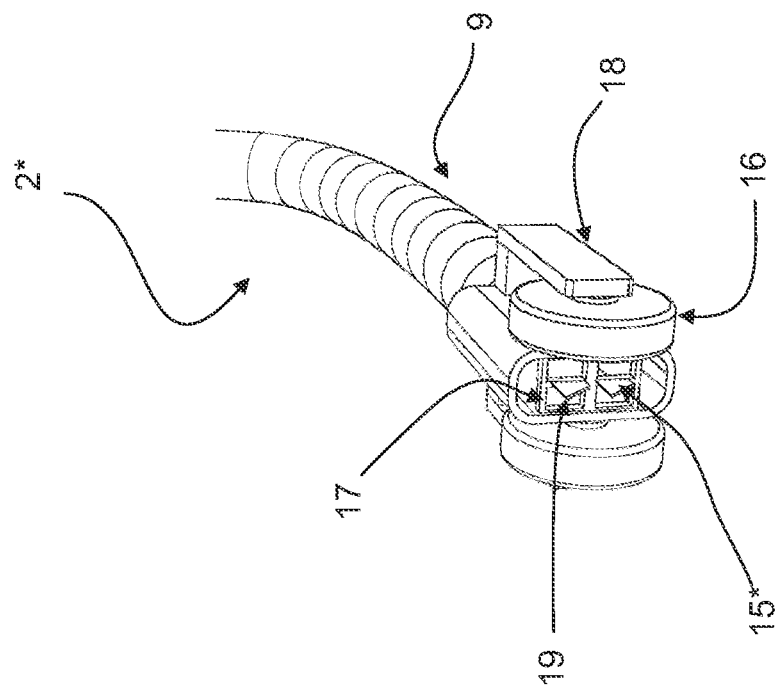
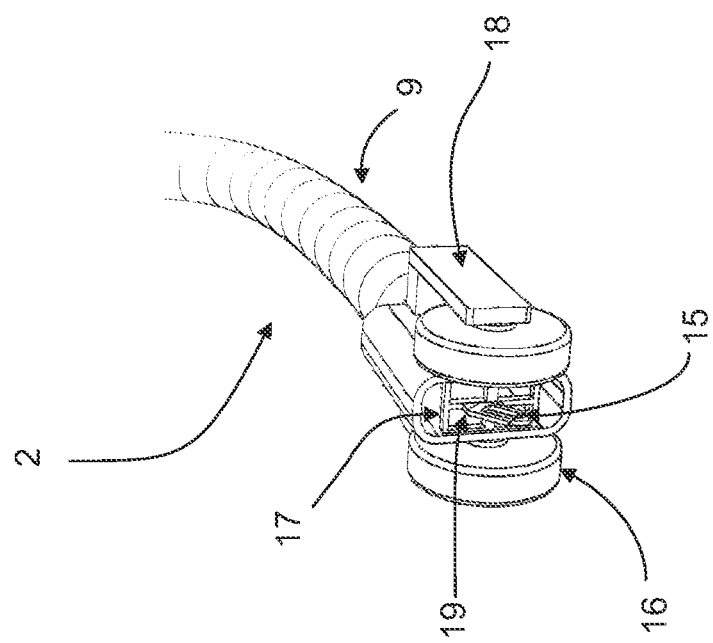

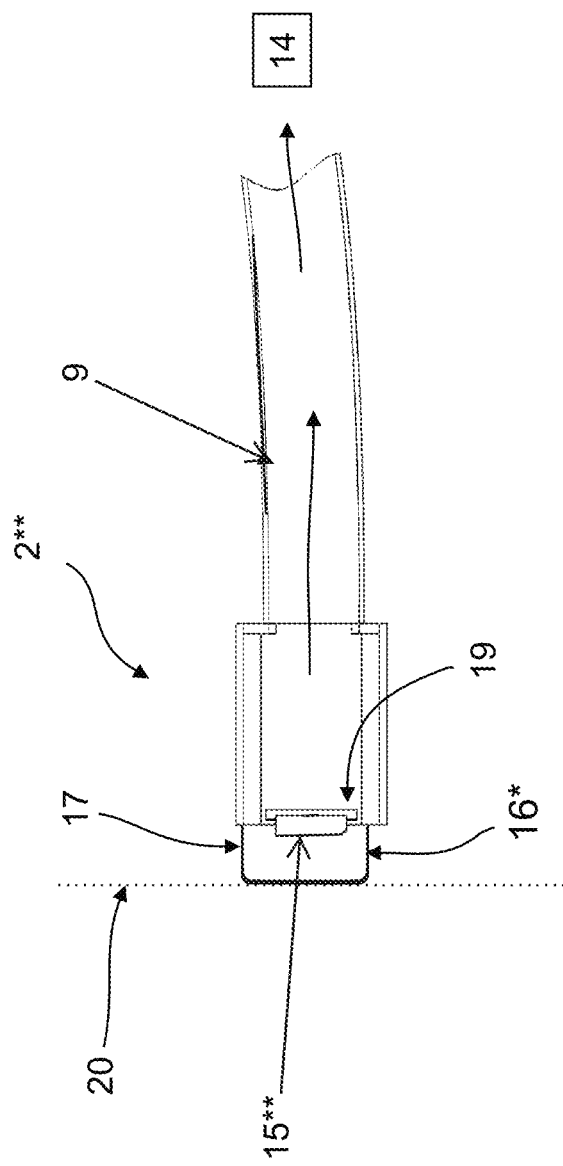

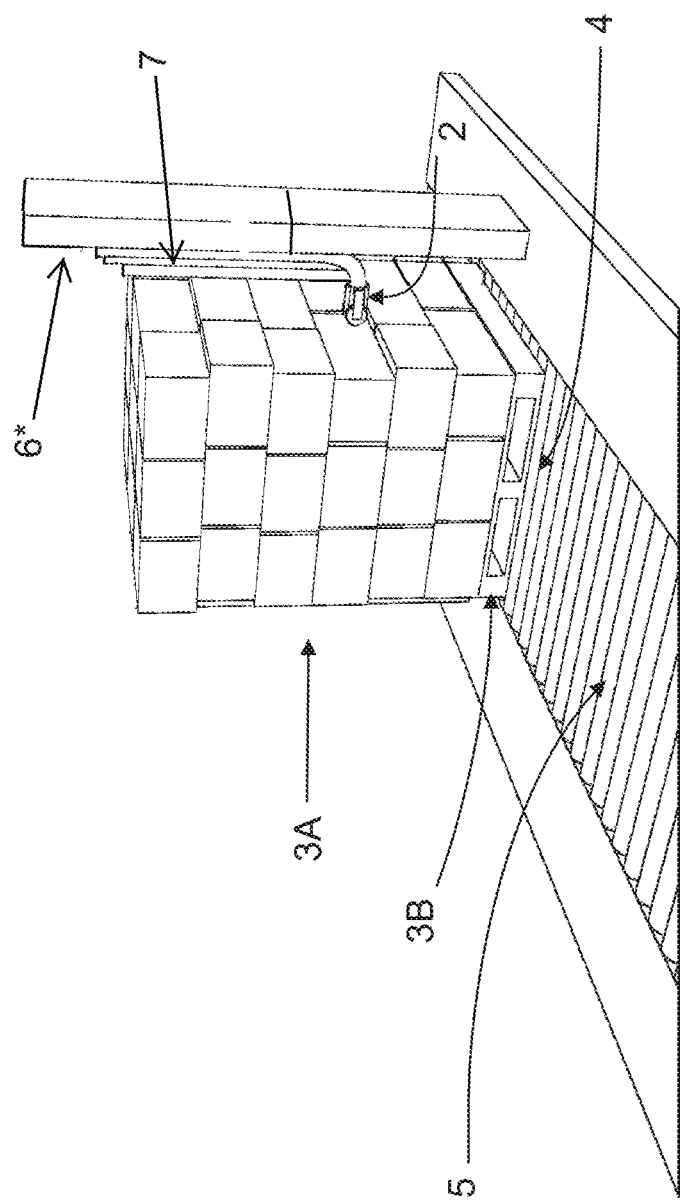

DEVICE AND METHOD FOR AUTOMATICALLY REMOVING A FILM WRAPPING FROM PALLETIZED STACKS OF PRODUCTS

CROSS REFERENCE TO RELATED APPLICATION

The present application claims the priority benefits of German patent application no. 10 2021 107 386.3, filed on Mar. 24, 2021.

BACKGROUND AND FIELD OF THE INVENTION

The invention relates to a device and a method for automatically removing a film wrapping from palletized stacks of products.

In order to secure a load, products stacked on pallets are often wrapped with a stretch film or provided with a shrink film hood-film wrap after formation of the stack so that the products do not slip during transportation. However, it is difficult to remove this film wrapping later during unpacking. This is therefore frequently still carried out manually.

EP 0 720 564 A1 describes a device and a method, with which, in order to remove a film hood pulled over the stack of goods, in which the film hood is cut open vertically on one side of the stack of goods, a cut edge is grasped and fastened to a winding mandrel and then the winding mandrel is guided around the stack of goods and thus the film is wound onto the winding mandrel rotating about its longitudinal axis. For this purpose, the film is cut vertically by means of knife and regions are lifted from the stack by means of a suction device. US 2004/0099110 A1 discloses the arranging of corresponding devices on opposite sides of the wrapped stack, these devices cutting simultaneously on both sides analogously to EP 0 720 564 A1.

SUMMARY OF THE INVENTION

The present invention provides an improved device and method for automatically removing a film wrapping that functions better in particular in the case of pallets stacked in a non-uniform or mixed manner.

It has been recognized in accordance with the invention that when a cutting head for cutting a film wrapping from palletized stacks of products is designed with a cutting element to cut through the film, where the cutting element is disposed between at least two opposing contact elements and is set back with respect to the film contact plane formed by the opposing contact elements in order to form a cutting recess, and with a vacuum unit to suck the region of the film wrapping to be cut locally into the cutting recess in order to interact with the cutting element, it is possible, both manually and also in an automated manner, to guide the cutting head always along the surface of the stack wrapped with film and to lift off the film only in the region of the cutting element so that it is cut in a safe and reliable manner. In other words, during cutting, the cutting head is always in contact with the film surface of the stack via the contact elements. This is particularly important in the case of mixed stacks, i.e. stacks made up of different items, since these form an irregular outer contour and therefore the film likewise forms an irregular contour and the contact makes possible safe and reliable cutting.

The set-back cutting recess conceals the cutting tool or cutting element from accidental contact. The contact elements in a preferred embodiment are formed as sliding elements and/or rolling elements. The sliding elements can be e.g. runners which have e.g. a friction-reducing surface. This is advantageous since the films are frequently "sticky". The rolling elements can be e.g. rollers.

The use of more than two opposing contact elements is also feasible. Thus, it can be advantageous to arrange the cutting recess between two pairs of opposing contact elements. The cutting head can then tilt less easily since it is guided at four points.

In order to actually cut the film, the cutting head has a cutting element. The cutting element can be e.g. a rigid or rotating knife, a glow wire or an arc torch. The arc torch is preferred since it cuts all types of films in a particularly reliable manner.

In accordance with a further aspect of the invention, during cutting, the film is sucked by a vacuum unit only locally into the cutting recess to interact with the cutting element. For this purpose, the vacuum unit can have at least one suction opening, next to which the cutting element is placed. Two (or more) suction openings can preferably also be provided, between which the cutting element is disposed (possibly centrally).

The invention also relates to the use of at least one corresponding cutting head in an automated device with a pallet place for the arrangement of the pallet correspondingly wrapped with film, wherein the cutting head is disposed at one end of a support arm which can travel in such a way that the cutting head is always in contact with the film via the two opposing contact elements during cutting.

In a preferred embodiment, the support arm is designed to be able to travel both vertically and horizontally in a motorized manner controlled by a controller in such a way that the cutting head is always in contact with the film during cutting. This has in particular the advantage that, by reason of the manifold mobility, the support arm can always hold the cutting head in contact with the film even in the case of an irregular contour.

For this purpose, the controller can comprise a device which determines the pressing force of the cutting head on the film and permits adjustment. The device can comprise e.g. a tactile sensor, the data of which are fed into the controller in order to permit an adjustment. Alternately or additionally, the motorized drive of the support arm can comprise a torque monitor, the data of which are fed into the controller in order to permit an adjustment.

The device can be designed in an extremely wide variety of ways. In a preferred embodiment, the device is formed in a gantry-like manner so that the support arm is a component of a gantry frame on which the support arm can then be displaced in a motorized manner, wherein the pallet-provisioning place is disposed on a conveyor which runs through the gantry. Alternatively, the support arm can also be designed as part of a multi-axis industrial robot.

It will be understood that the term 'pallet' also includes other similar loading aids.

Further details of the invention will become clear from the following description of exemplified embodiments by reference to the drawings.

BRIEF DESCRIPTION OF THE DRAWINGS

FIG. 2 is a schematic perspective view of a first cutting head in accordance with the invention for cutting a film wrapping, in particular in a device as shown in FIG. 1; and FIG. 3 is a schematic perspective view of a further cutting head in accordance with the invention for cutting a film wrapping, in particular in a device as shown in FIG. 1;

FIG. 5 is a cross-sectional view through an alternative cutting head; and

FIG. 6 is a schematic perspective view of a further automated device with a cutting head for automatically removing a film wrapping from palletized stacks of products.

DESCRIPTION OF THE PREFERRED EMBODIMENTS

Figure 1:
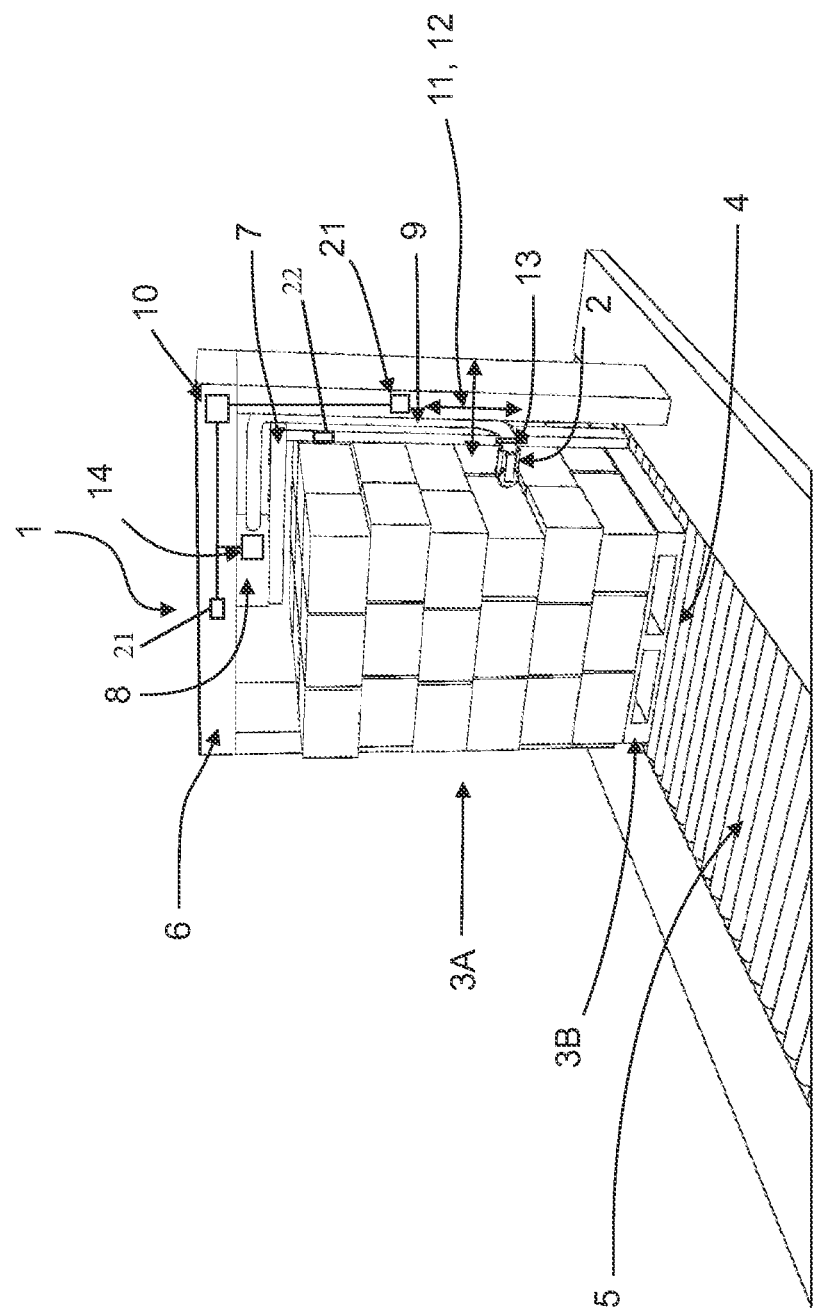
FIG. 1 is a schematic perspective view of an automated device with a cutting head for automatically removing a film wrapping from palletized stacks of products.

FIG. 1 shows a device designated as a whole by 1 for automatically removing a film wrapping from palletized stacks of products. For this purpose the device comprises a cutting head 2 for cutting the film which is wrapped around a stack 3A on a pallet 3B. The pallet 3B with the wrapped stack 3A is provided on a pallet place 4 for the arrangement, said pallet place being on a roller conveyor 5 which travels through the gantry frame 6 of the device. In another example, as shown in FIG. 6, the device includes a cutting head 2 mounted to an industrial robot 6*.

The cutting head 2 is disposed at one end of an L-shaped support arm 7 so as to be able to travel on a carriage 13 in such a way that it is designed to be able to travel both vertically and also horizontally in a motorized manner, such as via a drive motor 21 or motorized carriage 13, controlled by a controller 10 in such a way that the cutting head 2 is always in contact with the film during cutting. This is indicated by the arrows 11, 12. In addition, the support arm 7 is articulated on the gantry head via a pivot or rotating device 8 so that the support arm 7 can swivel about the pallet 3B or stack 3A in order e.g. ultimately to remove the film which has been cut through.

The motorized displacement means for the carriage 13 comprises a force and/or torque monitor 21 which feeds the controller 10 with data relating to the contact force of the cutting head 2 so that contact can be adjusted.

A vacuum hose 9 extends from the cutting head 2 along the support arm 7 to the rotating device 8, this vacuum hose being acted upon by a pump 14 which is received in the rotating device 8 and is likewise adjusted by the controller 10.

Three different variants of the cutting head 2, 2* and 2** are shown in detail in FIGS. 2-5. These correspond to the greatest possible degree but differ in the actual design of the cutting element. In FIG. 2, the cutting element for the cutting head 2 for cutting through the film is an arc torch 15, whereas in the variant of FIG. 3 FIGS. 3 and 4, the cutting element for the cutting head 2* consists of fixed knives 15*. In FIG. 5, the cutting element for the cutting head 2 consists of a glow wire 15.

Figure 4:
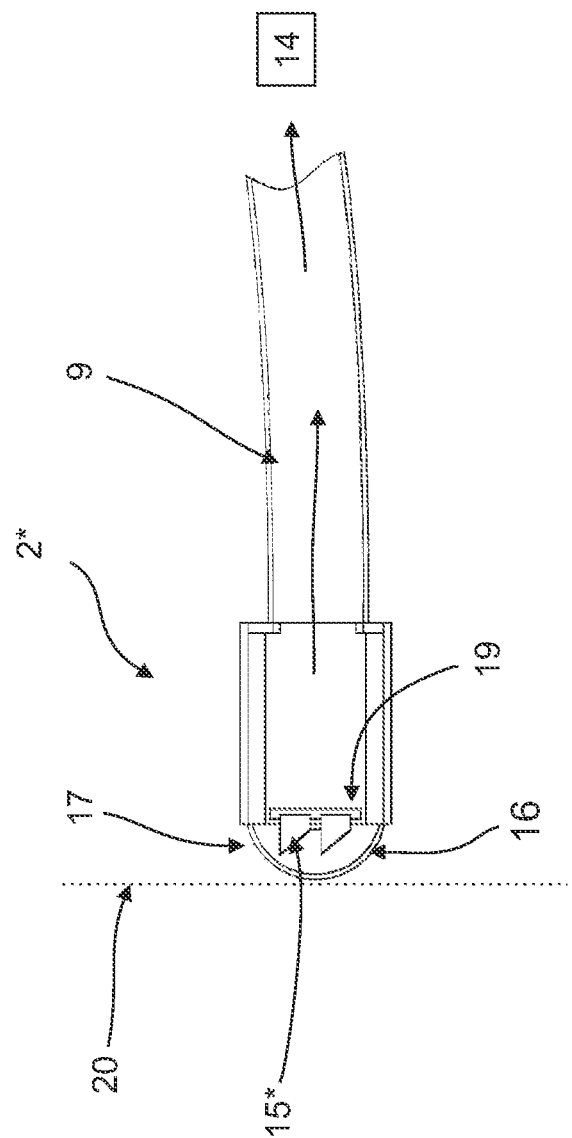
FIG. 4 shows a cross-sectional view through the cutting head of FIG. 3.

The respective cutting element 15, 15*, 15** is disposed between two opposing contacts or contact elements, which are shown as rollers 16 in FIGS. 2-4 and as slides 16* in FIG. 5 (one shown), and is set back with respect to the film contact plane 20 formed by the opposing rollers 16 (cf. FIG. 4) or slides (FIG. 5) in order to form a cutting recess 17. With reference to FIGS. 2-3, the rollers 16 and the cutting element 15, 15* are fastened to a housing 18 which provides the spaced-apart axes for the rollers 16 and the intermediate space for the cutting recess 17. At the end remote from the cutting recess 17, the housing 18 is connected to the vacuum hose 9 so that the cutting recess 17 is connected, via a lattice-like suction opening 19, to the vacuum pump 14 in order to suck the region of the film wrapping to be cut locally into the cutting recess 17 for interaction with the cutting element. The respective cutting element 15, 15* is thus disposed centrally on the lattice of the suction opening 19. Suction openings are thus disposed around the respective cutting element 15, 15*. The cutting head 2** of FIG. 5 is similarly configured.

In order to cut the film wrapping the pallet 3B is thus first positioned with the wrapped stack 3A below the gantry 6 on the provisioning place 4 on the conveyor 5. The cutting head 2 is then positioned on the upper edge of the stack 3A and moved towards the film via the support arm 7 and carriage 13. The vacuum is then applied to the cutting head 2 via the pump 14, and the cutting element 15 cuts through the film when the head 2 is being moved downwards.

The contact force of the cutting head 2 is continuously checked and adjusted via the torque monitor 21 and the controller 10 so that the head is applied in spite of the irregular contour. Alternately or additionally, a tactile sensor 22 may be provided on the support arm for determining the pressing force, the data from which is fed into the controller 10 in order to permit an adjustment of the pressing force. Having reached the bottom, i.e. after cutting of the whole film, the cutting element 15 is turned off (arc torch) but the vacuum is maintained where required and the support arm 7 is now swivelled around the stack 3A by the rotating device so that the film is pulled off. Finally, the removed film is then disposed of.

The invention claimed is:

1. A device for removing a film wrapping from a palletized stack of products, said device comprising:
    a cutting head disposed on a support arm, said cutting head comprising,
        a cutter for cutting through the film, wherein the cutter is disposed between at least two opposing contacts and is set back with respect to a film contact plane formed by the opposing contacts in order to form a cutting recess; and
        a vacuum unit configured to generate suction between the at least two opposing contacts to suck a region of the film wrapping into the cutting recess and into contact with the cutter;
    wherein the contacts comprise a pair of spaced apart rollers disposed laterally on either side of the cutter with respect to a cutting direction of the cutting head; and
    wherein the support arm is moveable under operation of a controller to place the contacts of the cutting head against a vertically oriented surface of the film of the stack and move the cutting head there along to cut the film sucked by the vacuum unit into the cutting recess and into contact with the cutter, and further comprising a sensor configured to operably communicate with the controller for monitoring a force of the cutting head against the surface of the film for use in maintaining the cutting head in contact with the film during cutting, wherein the cutting head further comprises a housing, and wherein the cutter is disposed within the housing and the rollers are fastened to the housing.

2. The device as claimed in claim 1, wherein the cutter comprises a rigid or rotating knife, a glow wire or an arc torch.

3. The device as claimed in claim 2, wherein the vacuum unit comprises at least one suction opening, and wherein the cutter is disposed next to the at least one suction opening.

4. The device as claimed in claim 1, wherein the vacuum unit comprises at least one suction opening, and wherein the cutter is disposed next to the at least one suction opening.

5. The device as claimed in claim 1, wherein the vacuum unit comprises at least one suction opening at the housing, and wherein the cutter is disposed next to the at least one suction opening.

6. A device for removing a film wrapping from palletized stacks of products, said device comprising:
 a cutting head, wherein the cutting head comprises a cutter for cutting through the film, wherein the cutter is disposed between at least two opposing contacts and is set back with respect to a film contact plane formed by the opposing contacts in order to form a cutting recess, and a vacuum unit to generate suction between the at least two opposing contacts to suck a region of the film wrapping to be cut locally into the cutting recess and into contact with the cutter, wherein the contacts comprise a pair of spaced apart rollers disposed laterally on either side of the cutter with respect to a cutting direction of the cutting head;
 a pallet place for an arrangement of a pallet correspondingly wrapped with film; and
 a support arm moveable by a motorized drive;
 wherein the cutting head is disposed at one end of the support arm, and wherein the support arm is configured to travel under operation of a controller such that the cutting head maintains contact with the film via the two opposing contacts while the vacuum unit sucks the film into the cutting recess and into contact with the cutter during cutting, and further comprising a sensor configured to operably communicate with the controller for monitoring a force of the cutting head against a surface of the film for use in maintaining the cutting head in contact with the film during cutting, wherein the cutting head further comprises a housing, and wherein the cutter is disposed within the housing and the rollers are fastened to the housing.

7. The device as claimed in claim 6, wherein the support arm is configured to travel both vertically and horizontally via the controller such that the cutting head remains in contact with the film during cutting.

8. The device as claimed in claim 7, wherein the sensor comprises a tactile sensor on the support arm, and wherein the controller is fed with data from the sensor relating to a pressing force of the cutting head.

9. The device as claimed in claim 8, wherein the motorized drive of the support arm comprises a force monitor and/or a torque monitor which feeds the controller with data relating to the pressing force of the cutting head.

10. The device as claimed in claim 8, wherein the support arm is a component of a gantry frame or an industrial robot.

11. The device as claimed in claim 7, wherein the sensor comprises a force monitor and/or a torque monitor of the motorized drive, and wherein the sensor of the motorized drive feeds the controller with data relating to a pressing force of the cutting head.

12. The device as claimed in claim 7, wherein the support arm is a component of a gantry frame or an industrial robot.

13. The device as claimed in claim 6, wherein the support arm is a component of a gantry frame or an industrial robot.

14. The device as claimed in claim 1, wherein the sensor comprises a tactile sensor on the support arm.

15. The device as claimed in claim 1, wherein the sensor comprises a force monitor and/or a torque monitor of a motorized drive for the support arm.

* * * * *

UNITED STATES PATENT AND TRADEMARK OFFICE
CERTIFICATE OF CORRECTION

Page 1 of 1

PATENT NO. : 12,492,033 B2
APPLICATION NO. : 17/697595
DATED : December 9, 2025
INVENTOR(S) : Daniel Jarr and Max-Reinhard Lewandoske It is certified that error appears in the above-identified patent and that said Letters Patent is hereby corrected as shown below:

In the Specification

Column 3
Line 55, delete "FIG. 3" before "FIGS. 3"
Line 63, delete "cf." before "FIG."

Signed and Sealed this
Third Day of February, 2026

John A. Squires
*Director of the United States Patent and Trademark Office*